(12) United States Patent
Hong et al.

(10) Patent No.: US 8,719,564 B2
(45) Date of Patent: May 6, 2014

(54) METHOD FOR SHARING SECRET VALUES BETWEEN SENSOR NODES IN MULTI-HOP WIRELESS COMMUNICATION NETWORK

(71) Applicant: Intellectual Discovery Co., Ltd., Seoul (KR)

(72) Inventors: Choong Seon Hong, Yongin-si (KR); Eung Jun Cho, Suwon-si (KR); Hee Bum Pyun, Seoul (KR)

(73) Assignee: Intellectual Discovery Co., Ltd., Seoul (KR)

( * ) Notice: Subject to any disclaimer, the term of this patent is extended or adjusted under 35 U.S.C. 154(b) by 0 days.

(21) Appl. No.: 13/775,379

(22) Filed: Feb. 25, 2013

(65) Prior Publication Data
US 2013/0173910 A1    Jul. 4, 2013

Related U.S. Application Data

(63) Continuation of application No. PCT/KR2010/006233, filed on Sep. 13, 2010.

(30) Foreign Application Priority Data

Aug. 25, 2010 (KR) ........................ 10-2010-0082624

(51) Int. Cl.
*H04L 29/06* (2006.01)
*H04W 12/04* (2009.01)
*H04L 9/08* (2006.01)

(52) U.S. Cl.
CPC ........... *H04W 12/04* (2013.01); *H04L 63/0471* (2013.01); *H04L 2463/061* (2013.01); *H04L 2463/062* (2013.01); *H04L 9/0816* (2013.01); *H04L 9/0861* (2013.01)
USPC ......................................... 713/153; 713/171

(58) Field of Classification Search
CPC .. H04W 12/04; H04W 12/02; H04L 63/0471; H04L 2463/061; H04L 2463/062; H04L 9/0816; H04L 9/0861
USPC ........ 713/153, 168, 171; 380/28–29, 44, 270, 380/277; 726/3
See application file for complete search history.

(56) References Cited

U.S. PATENT DOCUMENTS 7,573,855 B2 * 8/2009 Hohl et al. .................... 370/338
(Continued)

FOREIGN PATENT DOCUMENTS

| KR | 10-0941764 A | 2/2010 |
| KR | 10-20100042738 A | 4/2010 |

OTHER PUBLICATIONS

Hao Yang, "Security in Mobile Ad Hoc Networks: Challenges and Solutions", UCLA Computer Science Department, IEEE, Feb. 2004.*

(Continued)

*Primary Examiner* — Samson Lemma
(74) *Attorney, Agent, or Firm* — Pearne & Gordon LLP (57) ABSTRACT

A method for sharing a secret key between a source node and a destination node includes (a) adding, at each forward intermediate node, a secret key between the forward intermediate node and a node before the forward intermediate node to the secret key sharing request message; (b) generating a shared secret key between the source node and the destination node from the secret key between the forward intermediate node and the node before the forward intermediate node added in the secret key sharing request message; (c) adding, at each backward intermediate node, a secret key between the backward intermediate node and a node before it to the secret key sharing response message; and (d) generating the shared secret key between the destination node and the source node from the secret key between the backward intermediate node and the node before it added in the secret key sharing response message.

11 Claims, 6 Drawing Sheets

(56) References Cited

U.S. PATENT DOCUMENTS

| | | | |
|---|---|---|---|
| 8,254,580 B2 * | 8/2012 | Rossi | 380/278 |
| 8,423,772 B2 * | 4/2013 | Lee et al. | 713/171 |
| 2008/0162939 A1 * | 7/2008 | Lee et al. | 713/171 |
| 2010/0299519 A1 * | 11/2010 | Xiao et al. | 713/155 |

OTHER PUBLICATIONS

International Search Report for PCT/KR2010/006233 dated Sep. 23, 2011.

* cited by examiner

METHOD FOR SHARING SECRET VALUES BETWEEN SENSOR NODES IN MULTI-HOP WIRELESS COMMUNICATION NETWORK

TECHNICAL FIELD

The present disclosure relates to a method for sharing secret values between sensor nodes in a multi-hop wireless communication network; and, more particularly, relates to a method for generating secret values between sensor nodes using a wireless channel characteristic between the sensor nodes, and for sharing a secret value between a source node and a destination node in a multi-hop wireless communication network by using the generated secret values.

BACKGROUND ART

In a wireless sensor network, since an unlicensed third-party sensor node may access the wireless sensor network and illegally hack data transceived between legal sensor nodes, safe transception of data between the sensor nodes is a very important issue. Especially, in the wireless sensor network, a sensor node transmits a signal in all directions using a directive antenna (that is, transmits the signal in a broadcasting way), an unlicensed third-party may be able to easily hack data transceived between the sensor nodes. For safe transception of data, typically, the data transceived between the sensor nodes are encrypted. Conventionally, there have been used various methods for generating secret values to be used between the sensor nodes for the encryption of data and distributing the generated secret values safely.

One of such conventional methods is using a public key authentication center connected to the wireless sensor network. The public key authentication center generates a private key and a public key of each sensor node and distributes the generated private key and public key to each sensor node. One sensor node may encrypt data by using a public key of the other sensor node received from the public key authentication center and transmits the encrypted data to the other sensor node. The other sensor node that has received the encrypted data may decrypt the data by using its private key. In the secret key generation and distribution technique based on the public key authentication center, however, it is essential to additionally provide the public key authentication center. Further, in this method, in order to send data from one sensor node to the other, the one sensor node should have the public key of the other sensor node. However, in consideration of the characteristic of the wireless sensor network that is randomly distributed in a region where people is difficult to access, it would be difficult to embody this technique due to the difficulty in communications between the wireless network and the public key authentication center. Further, it would also be difficult to embody this technique in sensor nodes equipped with a low energy source.

Figure 1:
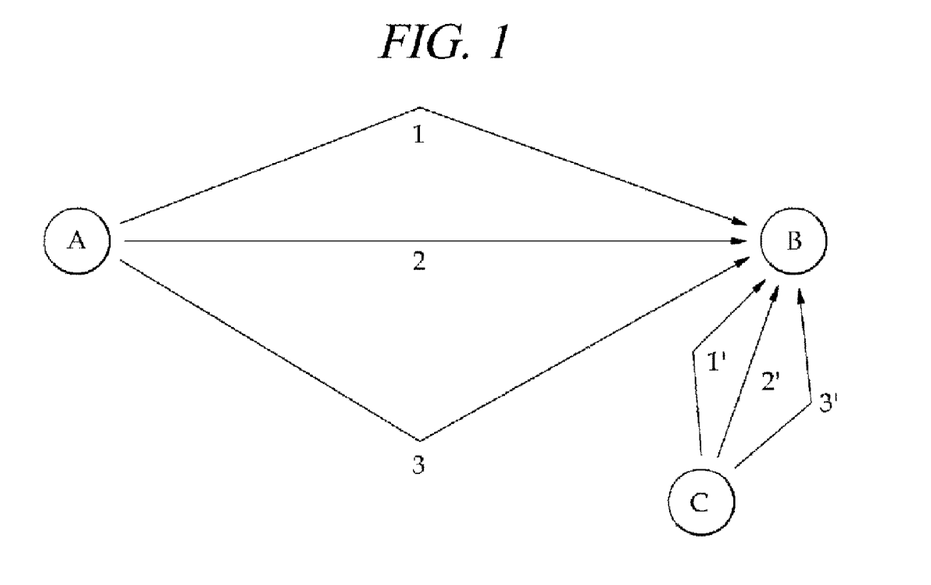
FIG. 1 is a diagram for describing a conventional method for generating a secret key using a physical layer characteristic of a wireless communication channel between sensor nodes.

To solve the aforementioned problems, in another conventional method, a secret key is generated by using a physical layer characteristic of a wireless communication channel between sensor nodes. Referring to FIG. 1, a signal transmitted from a sensor node A to a sensor node B is sent in a broadcasting way, and the transmitted signal is delay-spread according to a communication channel environment, i.e., a physical layer characteristic between the sensor node A and the sensor node B and then received by the sensor node B. Accordingly, even in case a same signal is transceived between sensor nodes, the signals actually received by the respective sensors are all different.

By way of example, even in case the sensor node A and a sensor node C transmit the same signal to the sensor node B in a broadcasting way, the transmission signal broadcasted from the sensor node A is received by the sensor node B as a signal 1, a signal 2 and a signal 3 through different delay spreads according to a physical layer characteristic between the sensor node A and the sensor node B. The transmission signal broadcasted from the sensor node C is received by the sensor node B as a signal 1', a signal 2' and a signal 3' through different delay spreads according to a physical layer characteristic between the sensor node B and the sensor node C.

The sensor node B may generate data of the physical layer characteristic between the sensor node B and the sensor node A according to the delay spread patterns of the signals 1, 2 and 3 received from the sensor node A. The generated data of the physical layer characteristic may be used as a secret key between the sensor node A and the sensor node B. Likewise, the sensor node B may generate data of the physical layer characteristic between the sensor node B and the sensor node C according to the delay spread patterns of the signals 1', 2 and 3' received from the sensor node C. The generated data of the physical layer characteristic may be used as a secret key between the sensor node C and the sensor node B.

Figure 2:
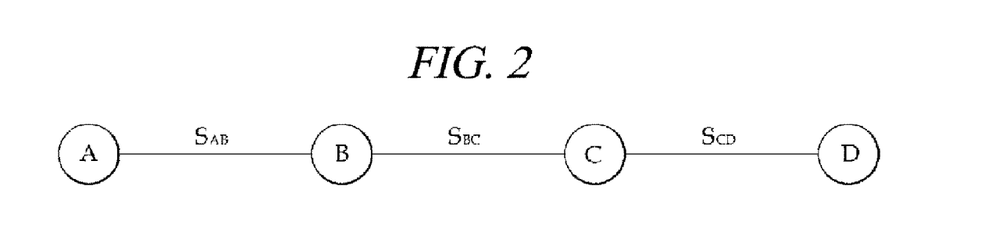
FIG. 2 is a diagram illustrating secret keys generated based on a physical layer characteristic between sensor nodes in a conventional multi-hop wireless communication network.

FIG. 2 illustrates secret keys generated based on physical layer characteristics between sensor nodes in a multi-hop wireless communication network.

Referring to FIG. 2, a sensor node A and a sensor node B generate a secret key $S_{AB}$ based on a physical layer characteristic therebetween and share the generated secret key $S_{AB}$. The sensor node B and a sensor node C generate a secret key $S_{BC}$ based on a physical layer characteristic therebetween and share the generated secret key $S_{BC}$. The sensor node C and a sensor node D generate a secret key $S_{CD}$ based on a physical layer characteristic therebetween and share the generated secret key $S_{CD}$.

When transmitting data from the sensor node A to the sensor node D while encrypting the data using the secret keys generated based on the physical layer characteristics in the multi-hop communication network, the sensor node A transmits the data to the sensor node B after encrypting the data with the secret key $S_{AB}$ between the sensor node A and the sensor node B. The sensor node B decrypts the received data with the secret key $S_{AB}$. Then, the sensor node B encrypts the decrypted data again with the secret key $S_{BC}$ and transmits the encrypted data to the sensor node C. The sensor node C decrypts the received data with the secret key $S_{BC}$. Then, the sensor node C encrypts the decrypted data again with the secret key $S_{CD}$ and transmits the encrypted data to the sensor node D. The sensor node D decrypts the received data with the secret key $S_{CD}$.

That is, the secret keys generated based on the physical layer characteristics may be different between the sensor nodes. In the multi-hop wireless communication network, whenever data is hopped, the data should be encrypted and decrypted with secrets keys of intermediate sensors in a routing path repeatedly. Accordingly, when transceiving data in the multi-hop wireless communication network using the secret keys generated based on the physical layer characteristics, a great amount of energy would be consumed for the encryption and decryption of the data. Thus, it may be difficult to apply this technique to a sensor node having a limited energy source.

Furthermore, in a mobile sensor network where sensor nodes are freely movable, in case a sensor node moves to another position from its original position, a secret key generated based on a physical layer characteristic between that sensor node and the other sensor is also changed. Thus, whenever the sensor nodes move, new secret keys need to be generated.

DISCLOSURE OF THE INVENTION

Problems to be Solved by the Invention

In view of the forgoing problems, the present disclosure provides a secret key sharing method capable of sharing a secret key with remarkably reduced data processing amount and calculation amount for encryption/decryption of data as compared to a conventional method, even when using a secret key generated based on a physical layer characteristic in a multi-hop wireless communication network with remarkably reduced data processing amount and calculation amount for encryption/decryption of data.

Further, the present disclosure also provides a secret key sharing method capable of sharing a secret key safely while protecting the secret key from an unlicensed third party even when using a secret key generated based on a physical layer characteristic in a multi-hop wireless communication network.

Means for Solving the Problems

In accordance with one aspect of the present disclosure, there is provided a method for sharing a secret key between a source node and a destination node in a multi-hop wireless communication network. The method includes adding, at each forward intermediate node on a routing path of a secret key sharing request message transmitted from the source node to the destination node, a secret key between the forward intermediate node and a node before the forward intermediate node to the secret key sharing request message; generating, at the destination node, a shared secret key between the source node and the destination node from the secret key between the forward intermediate node and the node before the forward intermediate node added in the secret key sharing request message; adding, at each backward intermediate node on a routing path of a secret key sharing response message transmitted from the destination node to the source node in response to the secret key sharing request message, a secret key between the backward intermediate node and a node before it to the secret key sharing response message; and generating, at the source node, the shared secret key between the destination node and the source node from the secret key between the backward intermediate node and the node before it added in the secret key sharing response message.

Herein, the secret key between the backward intermediate node and the node before the backward intermediate node is encrypted with a secret key between the backward intermediate node and a node after the backward intermediate node.

Herein, the secret key between the forward intermediate node and the node before the forward intermediate node or the secret key between the backward intermediate node and the node before the backward intermediate node is encrypted with a hash function.

Herein, the secret key between the forward intermediate node and the node before the forward intermediate node is determined based on a physical layer characteristic therebetween, and the secret key between the backward intermediate node and the node before the backward intermediate node is determined based on a physical layer characteristic therebetween.

Herein, the physical layer characteristic includes a delay spread characteristic of a signal transceived between the forward intermediate node and the node before the forward intermediate node; and a delay spread characteristic of a signal transceived between the backward intermediate node and the node before the backward intermediate node.

Furthermore, the method includes transmitting a secret key activation message including a seed key between the source node and the destination node to a sharing node that shares a first safe shared key with the source node; receiving, at the destination node, the secret key activation message from the sharing node that shares a second safe shared key with the destination node, and generating a final shared secret key between the source node and the destination node by extracting the seed key included in the secret key activation message; and after generating the final shared secret key at the destination node, transmitting a secret key activation response message including the seed key from the destination node to the source node.

Herein, the seed key between the source node and the destination node in the secret key activation message transmitted from the source node to the sharing node is primarily encrypted with the shard secret key between the source node and the destination node, and the primarily encrypted seed key between the source node and the destination node is secondarily encrypted with the first safe shared key, and the seed key between the source node and the destination node in the secret key activation message transmitted from the sharing key to the destination node is primarily encrypted with the secret shared key between the source node and the destination node, and the primarily encrypted seed key between the source node and the destination node is secondarily encrypted with the second safe shared key.

Herein, the seed key in the secret key activation response message is encrypted using a combination of the shared secret key between the destination node and the source node and the seed key.

Effect of the Invention

The secret key sharing method in accordance with the present disclosure has many advantages as follows, as compared to a conventional secret key sharing method.

First, the secret key sharing method in accordance with an illustrative embodiment, a shared secret key between a source node and a destination node from a combination of secret keys generated based on a physical layer characteristic between sensor nodes. Accordingly, without course to an additional public key authentication center, it is possible to share a secret key between the source node and the destination node.

Second, in the secret key sharing method in accordance with the present disclosure, the shared secret key between the source node and the destination node is generated from the combination of the secret keys generated based on the physical layer characteristic, and data encrypted by the source node with the shared secret key is decrypted at the destination node with the shared secret key. Accordingly, the encryption/decryption process need not be performed whenever the data is routed, so that energy consumption in the sensor nodes can be reduced.

Third, in the secret key sharing method in accordance with another illustrative embodiment, by generating a final shared secret key using a secret key activation message, the shared secret key can be prevented from being hacked by an attacker located on a routing path as well as an attacker located in the vicinity of the routing path.

BEST MODE FOR CARRYING OUT THE INVENTION

Prior to elaborating illustrative embodiments, assumptions for the illustrative embodiments will be first explained as follows.

First, a routing path of a message in a wireless sensor network is predetermined, and the message is transmitted through the routing path from a source node to a destination node.

Second, a multiple number of sensor nodes constituting the wireless sensor network are capable of detecting physical layer characteristics of neighboring sensor nodes. Based on the detected physical layer characteristics between the sensor nodes, secret keys between the sensor nodes are generated.

Third, the source node and the destination node do not move until a final secret key is shared.

Fourth, the sensor nodes in the wireless sensor network share the same hash function.

Fifth, at the time of initial formation of the wireless sensor network, each sensor node has at least one sharing node and safely shares a secret key with the sharing node.

Hereinafter, a method for sharing a secret key between sensor nodes in a multi-hop wireless communication network in accordance with illustrative embodiments will be elaborate with reference to the accompanying drawings.

Figure 3:
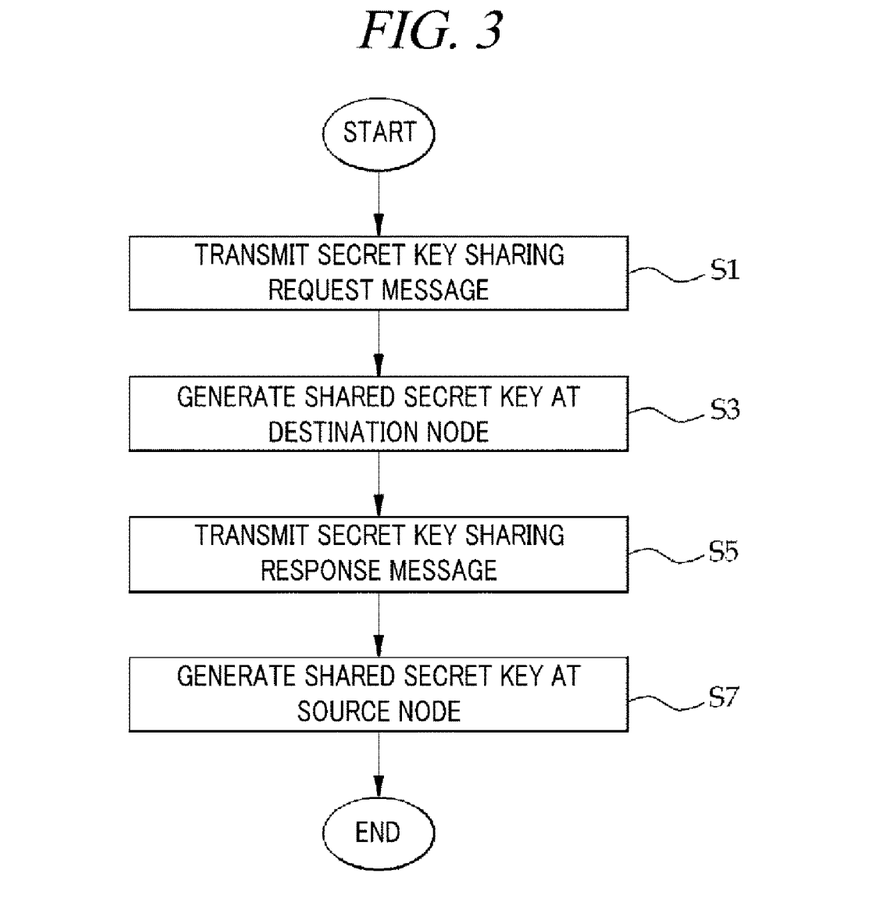
FIG. 3 is a flowchart for describing a method for sharing a secret key between sensor nodes in a multi-hop wireless communication network in accordance with a first illustrative embodiment.

FIG. 3 is a flowchart for describing a method for sharing a secret key between sensor nodes in a multi-hop wireless communication network in accordance with a first illustrative embodiment.

Referring to FIG. 3, among sensor nodes constituting a wireless sensor network, a source node transmits a secret key sharing request message to a destination node through a routing path (S1). To elaborate, the source node generates a secret key sharing request message composed of a source node address, a destination node address, a secret key sharing request message identifier, and a data field storing a secret key, and transmits the generated secret key sharing request message to the destination node through the routing path.

A multiple number of intermediate sensor nodes exist on the routing path between the source node and the destination node. Whenever the secret key sharing request message transmitted from the source node is routed from one node to a next node on the routing path, the next node adds a secret key between the previous node and itself to the data field of the secret key sharing request message. Hereinafter, a sensor node located on the routing path from the source node to the destination node will be referred to as a forward intermediate node.

When the secret key sharing request message transmitted through the routing path between the source node and the destination node is received by the destination node, the destination node extracts a secret key between each forward intermediate node and a node before that forward intermediate node added to the received secret key sharing request message, and generates a shared secret key between the source node and the destination node from a combination of the extracted secret keys and a secret key between the destination node and a node before the destination node (S3).

Figure 4:
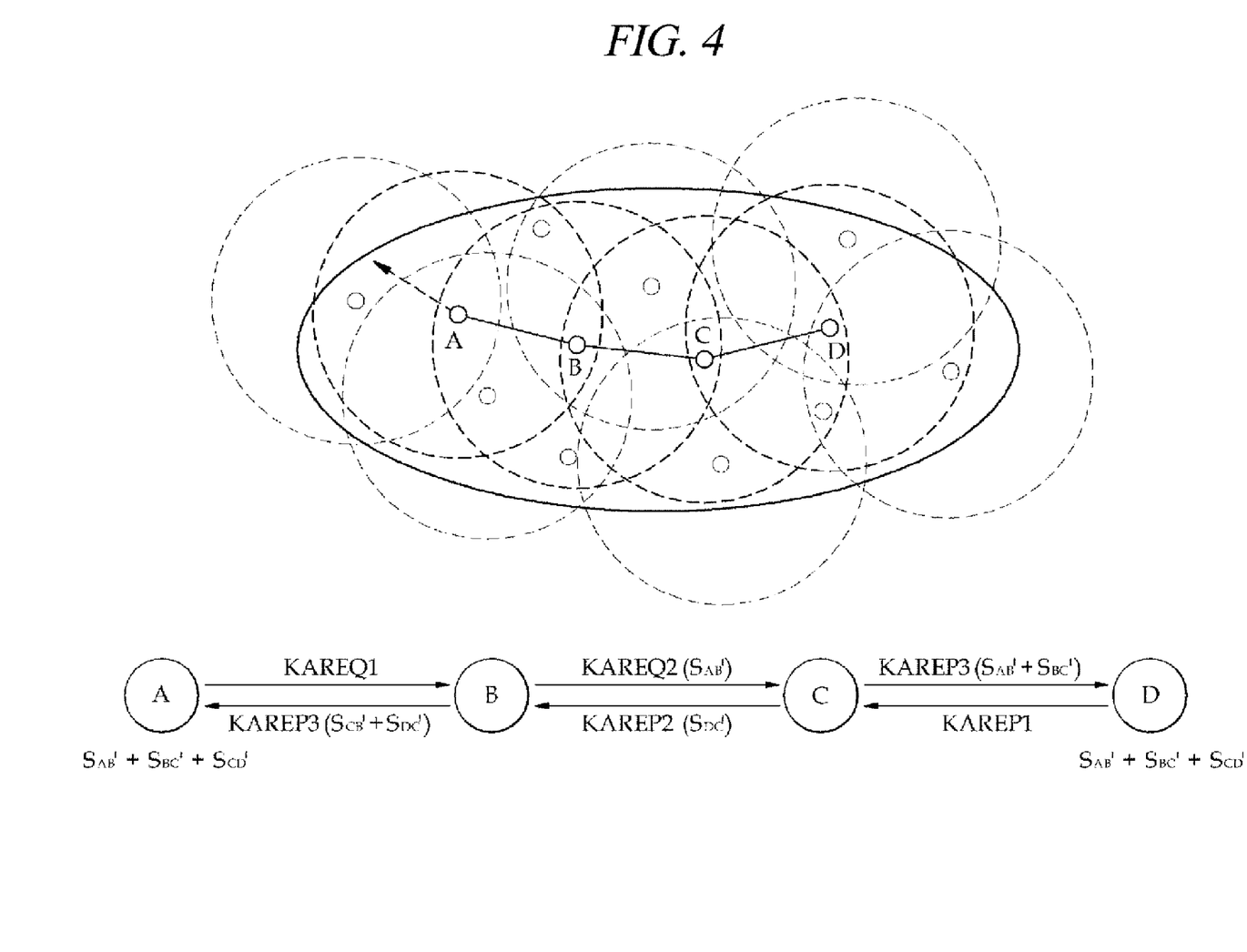
FIG. 4 is a diagram illustrating an example secret key sharing response message (KAREP) sent from a destination node to a sensor node.

Referring to FIG. 4, a secret key sharing request message KAREQ transmitted from a sensor node A to a destination node D will be discussed in further detail. The sensor node A generates a secret key sharing request message KAREQ1 in order to share a secret key with the destination node D and sends the generated secret key sharing request message KAREQ1 to a forward intermediate node B on a routing path. After receiving the secret key sharing request message KAREQ1, the forward intermediate node B generates a secret key sharing request message KAREQ2 by adding a secret key $S_{AB}$ between the source node A and the forward intermediate node B to a data field of the secret key sharing request message KAREQ1. Then, the forward intermediate node B transmits the generated secret key sharing request message KAREQ2 to a forward intermediate node C. Here, in order to prevent an unlicensed attacker sensor node from hacking the secret key $S_{AB}$ between the source node A and the forward intermediate node B stored in the secret key sharing request message KAREQ2, the secret key $S_{AB}$ between the source node A and the forward intermediate node B stored in the secret key sharing request message KAREQ2 is encrypted to $S_{AB}'$ with the hash function.

After receiving the secret key sharing request message KAREQ2, the forward intermediate node C generates a secret key sharing request message KAREQ3 by adding a secret key $S_{BC}$ between the forward intermediate node B and the forward intermediate node C to a data field of the secret key sharing request message KAREQ2. Then, the forward intermediate node C transmits the generated secret key sharing request message KAREQ3 to the destination node D. Here, the secret key $S_{BC}$ between the forward intermediate node B and the forward intermediate node C stored in the secret key sharing request message KAREQ3 is encrypted to $S_{BC}'$ with the hash function.

After receiving the secret key sharing request message KAREQ3, the destination node D extracts the secret key $S_{AB}''$ between the source node A and the forward intermediate node B and the secret key $S_{BC}'$ between the forward intermediate node B and the forward intermediate node C from the secret key sharing request message KAREQ3. Then, the destination node D generates a shared secret key between the source node A and the destination node D from a combination of the extracted secret keys $S_{AB}'$, $S_{BC}'$ and a secret key $S_{CD}'$ between the forward intermediate node C and the destination node that has been encrypted with the hash function. As one example, by adding the extracted secret keys $S_{AB}'$, $S_{BC}'$ and the secret key $S_{CD}'$ between the forward intermediate node C and the destination node, a shared secret key $S_{AB}'+S_{BC}'+S_{CD}'$ between the source node A and the destination node D may be generated. The way of combination of the secret key is shared between the source node A and the destination node D.

Referring back to FIG. 3, after generating the shared secret key between the sensor node and the destination node, the destination node transmits a secret key sharing response message to the source node through a routing path (S5).

A multiple number of intermediate sensor nodes exist on the routing path between the source node and the destination node. Whenever the secret key sharing response message sent from the destination node is routed from one node to a next node on the routing path, the next node adds a secret key between the previous node and itself to the data field of the secret key sharing response message. Hereinafter, a sensor node located on the routing path from the destination node to the source node will be referred to as a backward intermediate node.

When the secret key sharing response message transmitted through the routing path between the destination node and the source node is received by the source node, the source node extracts a secret key between each backward intermediate node and a node before that backward intermediate node added to the received secret key sharing response message, and generates a shared secret key between the destination node and the source node from a combination of the extracted secret keys and a secret key between the source node and a node before the source node (S7).

Referring to FIG. 4, a secret key sharing response message KAREP transmitted from a destination node D to a source node A will be discussed in further detail. The destination node D generates a secret key sharing response message KAREP1 in order to share a secret key with the source node A and sends the generated secret key sharing response message KAREP1 to a backward intermediate node C on the routing path. After receiving the secret key sharing response message KAREP1, the backward intermediate node C generates a secret key sharing response message KAREP2 by adding a secret key $S_{CD}$ between the destination node D and the backward intermediate node C to a data field of the secret key sharing response message KAREP1. Then, the backward intermediate node C transmits the generated secret key sharing response message KAREP2 to a backward intermediate node B. Here, in order to prevent an unlicensed attacker sensor node from hacking the secret key $S_{CD}$ between the destination node D and the backward intermediate node C stored in the secret key sharing response message KAREP2, the secret key $S_{CD}$ between the destination node D and the backward intermediate node C stored in the secret key sharing response message KAREp2 is encrypted to $S_{CD}'$ with the hash function.

After receiving the secret key sharing response message KAREP2, the backward intermediate node B generates a secret key sharing response message KAREP3 by adding a secret key $S_{BC}$ between the backward intermediate node C and the backward intermediate node B to a data field of the secret key sharing response message KAREP2. Then, the backward intermediate node B transmits the generated secret key sharing response message KAREP3 to the source node A. Here, the secret key $S_{BC}$ between the backward intermediate node C and the backward intermediate node B stored in the secret key sharing response message KAREP3 is encrypted to $S_{BC}'$ with the hash function.

After receiving the secret key sharing response message KAREP3, the source node A extracts the secret key $S_{CD}'$ between the destination node D and the backward intermediate node C and the secret key $S_{BC}'$ between the backward intermediate node C and the backward intermediate node B from the secret key sharing response message KAREQ3.

Then, the source node A generates a shared secret key between the destination node D and the source node A from a combination of the extracted secret keys $S_{CD}'$, $S_{BC}'$ and a secret key $S_{AB}'$ between the source node A and the backward intermediate node A. Here, as one example, by adding the extracted secret keys $S_{CD}'$, $S_{BC}'$ and the secret key $S_{AB}'$ between the source node A and the backward intermediate node B, a shared secret key $S_{AB}'+S_{BC}'+S_{CD}'$ between the destination node D and the source node A may be generated.

Figure 5:
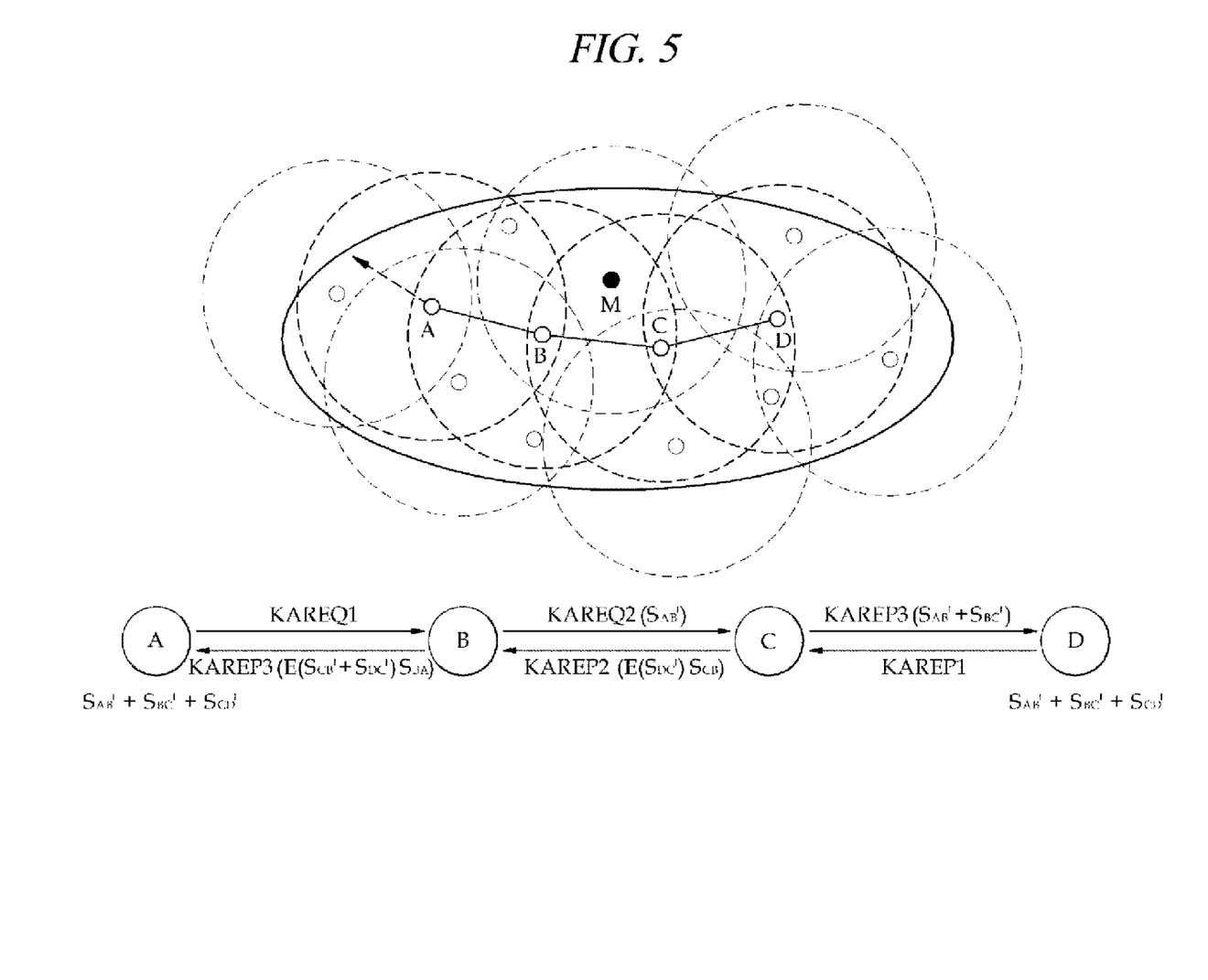
FIG. 5 is a diagram for describing a method for sharing a secret key in accordance with a second illustrative embodiment.

FIG. 5 is a diagram for describing a method for sharing a secret key in accordance with a second illustrative embodiment.

Referring to FIG. 5, a secret key sharing request message KAREQ transmitted from a sensor node A to a destination node D is the same as the secret key sharing request message KAREQ sent from the sensor node A to the destination node D described in FIG. 4. Thus, for the simplicity of explanation, redundant description will be omitted.

After generating a shared secret key between the source node A and the destination node D, the destination node D generates a secret key sharing response message KAREP1 for sharing the secret key with the source node A and transmits the generated secret key sharing response message KAREP1 to a backward intermediate node C on a routing path. After receiving the secret key sharing response message KAREP1, the backward intermediate node C encrypts a secret key $S_{CD}$ between the destination node and the backward intermediate node C to a secret key $S_{CD}'$ by using a hash function and encrypts the encrypted secret key $S_{CD}'$ again with a secret key $S_{BC}$ between a backward intermediate node B and the backward intermediate node C to a secret key $E(S_{CD}')S_{BC}$. Then, the backward intermediate node C generates a secret key sharing response message KAREP2 by adding the encrypted secret key $E(S_{CD}')S_{BC}$ to a data field of the secret key sharing response message KAREP1 and transmits the generated secret key sharing response message KAREP2 to the backward intermediate node B. In case that an attacker node M is located within a hop range of the backward intermediate node B, if the secret key $S_{CD}$ between the destination node D and the backward intermediate node C in the secret key sharing response message were encrypted only with the hash function, the attacker node M would be able to hack the secret key sharing response message KAREP and the secret key encrypted with the hash function in the secret key sharing response message. Thus, in accordance with the present illustrative embodiment, the secret key $S_{CD}'$ between the destination node D and the backward intermediate node C encrypted with the hash function is encrypted again with the secret key $S_{BC}$ between the backward intermediate node B and the backward intermediate node C, thus prevented from being hacked by the attacker node M.

After receiving the secret key sharing response message KAREP2, the backward intermediate node B encrypts the secret key $S_{BC}$ between the backward intermediate node B and the backward intermediate node C with the hash function to a secret key $S_{BC}'$. Then, the backward intermediate node B encrypts a combination of the secret keys $S_{BC}'$ and $S_{CD}'$ once encrypted with the hash functions with a secret key $S_{AB}$ between the backward intermediate node B and the source node A again to a secret key $E(S_{BC}'+S_{CD}')S_{AB}$. Then, the backward intermediate node B generates a secret key sharing response message KAREP3 by adding the encrypted secret key $E(S_{BC}'+S_{CD}')S_{AB}$ to a data field of the secret key sharing response message KAREP2, and transmits the generated secret key sharing response message KAREP3 to the source node A.

After receiving the secret key sharing response message KAREP3, the source node A decrypts the secret key $E(S_{BC}'+S_{CD}')S_{AB}$ in the secret key sharing response message KAREP3 with the secret key $S_{AB}$ between the backward intermediate node B and the source node and extracts the combination of the secret key $S_{CD}'$ between the destination node D and the backward intermediate node C and the secret key $S_{BC}'$ between the backward intermediate node C and the backward intermediate node B. Then, the source node A generates a shared secret key between the destination node D and the source node A from a combination of the extracted combination of the secret keys $S_{BC}'+S_{CD}'$ and the secret key $S_{AB}'$ encrypted with the hash function from the secret key $S_{AB}$ between the source node A and the backward intermediate node B. As one example, by adding the extracted secret keys $S_{BC}'+S_{CD}'$ and the secret key $S_{AB}'$ between the source node A and the backward intermediate node B, a shared secret key $S_{BC}'+S_{CD}'+S_{AB}'$ between the destination node D and the source node A may be generated.

Figure 6:
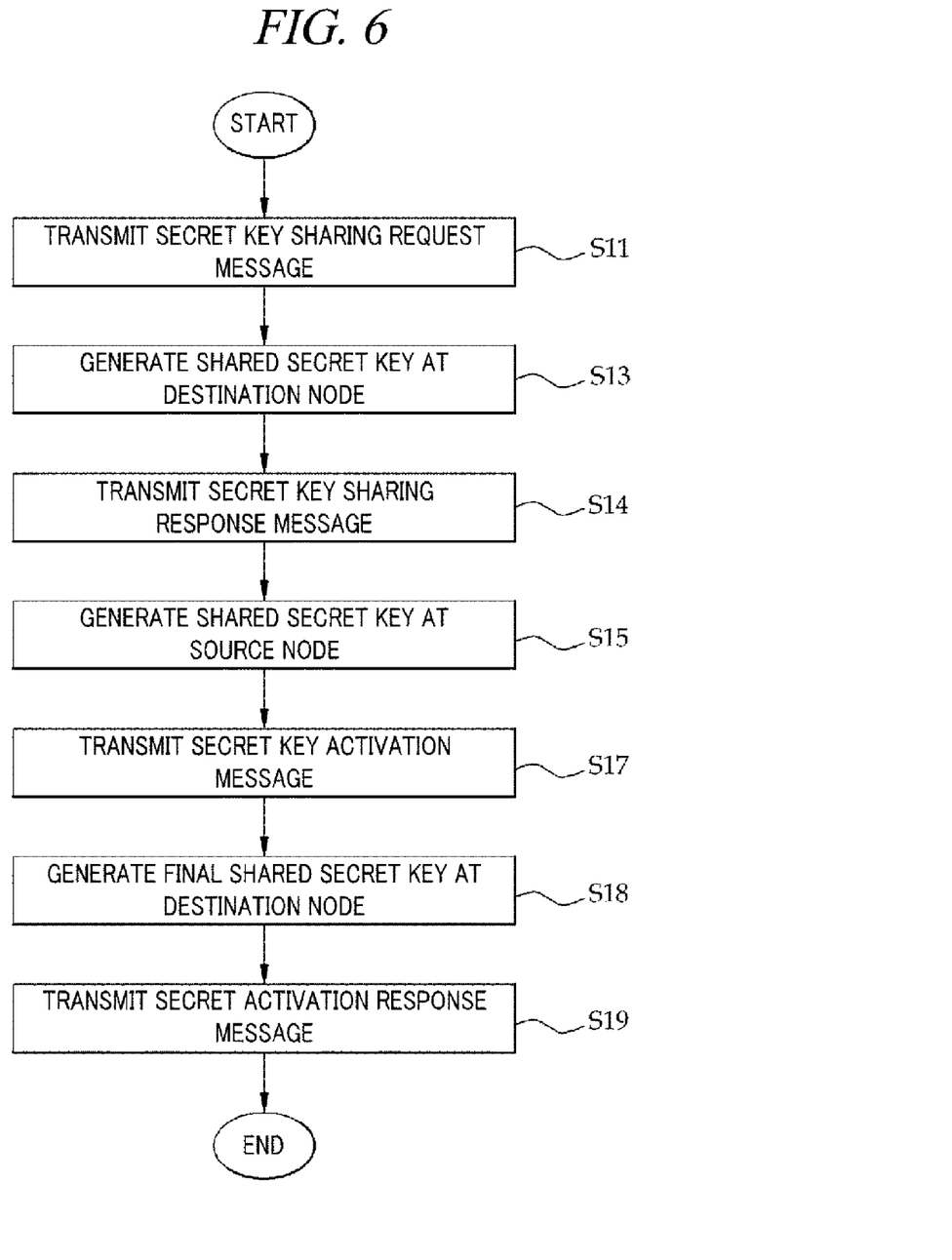
FIG. 6 is a flowchart for describing a method for sharing a secret key in accordance with a third illustrative embodiment.

FIG. 6 is a diagram for describing a method for sharing a secret key in accordance with a third illustrative embodiment.

Referring to FIG. 6, among sensor nodes constituting a wireless sensor network, a source node transmits a secret key sharing request message to a destination node through a routing path (S11). To elaborate, the source node generates a secret key sharing request message composed of an address of a destination node of the secret key sharing request message, a secret key sharing request message identifier and a data field storing a secret key. Then, the source node transmits the generated secret key sharing request message to the destination node through the routing path. Here, a source node address is not included in the secret key sharing request message. Whenever the secret key sharing request message transmitted from the source node is routed to a forward intermediate node on the routing path, the forward intermediate node generates a shared secret key by adding a secret key between a previous node and itself to a data field of the secret key sharing request message. Here, the secret key between the forward intermediate node and the node before it is encrypted by using a hash function.

After receiving the secret key sharing request message transmitted through the routing path between the source node and the destination node, the destination node extracts the shared secret key stored in the received secret key sharing request message, and generates a shared secret key between the source node and the destination node from a combination of the extracted shared secret key and a secret key between the destination node and a node before it (S13).

After generating the shared secret key between the sensor node and the destination node, the destination node transmits a secret key sharing response message KAREP to the source node through the routing path (S14). Whenever the secret key sharing response message is routed to a backward intermediate node on the routing path, the backward intermediate node generates a shared secret key by adding a secret key between a previous node and itself to a data field of the secret key sharing response message. Here, the secret key between the backward intermediate node and the node before it is encrypted with the hash function.

After receiving the secret key sharing response message transmitted through the routing path between the destination node and the source node, the source node decrypts the shared secret key encrypted with a secret key between the source node and a node before it with the secret key between the source node and the node before it, and then generates a shared secret key between the destination node and the source node from a combination of the decrypted shared secret key and the secret key between the source node and the node before it (S15). Steps S11, S13, S14 and S15 are the same as described above in FIG. 5. Thus, redundant description will be omitted.

Each forward intermediate node located on the routing path of the secret key sharing request message is just capable of recognizing reception of the secret key sharing request message from a previous node, but does not know a source node address of the secret key sharing request message. Accordingly, even in case that an attacker node located on the routing path or in the vicinity thereof hacks the secret key sharing request message or the secret key sharing response message, the attacker node cannot be informed of the source node. The destination node does not also know the address of the source node with which it would share a secret key.

The source node generates a secret key activation message composed of the secret key sharing request message identifier, the destination node address and a seed key encrypted with a secret key between a source node and a sharing node, and transmits the generated secret key activation message to the sharing node (S17). The source node randomly generates a seed key between the source node and the destination node. Then, the source node encrypts the generated seed key with the shared secret key between the source node and the destination node and encrypts the encrypted seed key with a secret key between the source nod and the sharing node. Here, the sharing node refers to a node that safely shares a secret key with the source node.

The destination node receives the secret key activation message back from the sharing node, and generates a final shared secret key between the source node and the destination node based on the secret key sharing request message identifier and the seed key extracted from the received secret key activation message (S18). Here, the final shared secret key may be generated from a combination of the seed key and the shared secret key between the source node and the destination node. When generating the final shared secret key, the destination node transmits a secret key activation response message and transmits the generated secret key activation response message to the source node through the routing path for the secret key sharing response message (S19). Here, the secret key activation response message includes a seed key encrypted with the final shared secret key.

Figure 7:
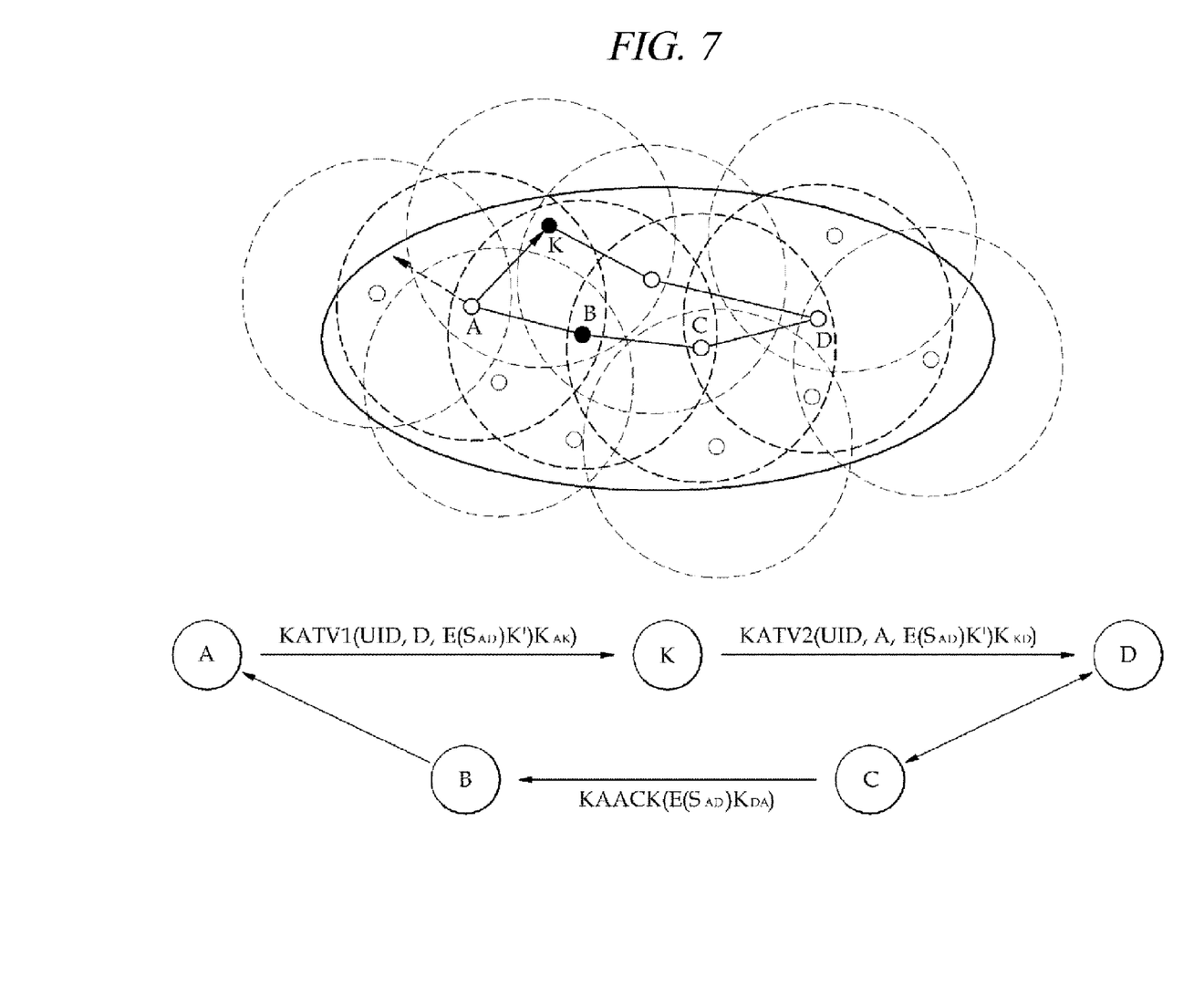
FIG. 7 is a diagram illustrating messages transceived between a source node and a destination node to share a final secret sharing key in the method for sharing a secret key in accordance with the third illustrative embodiment.

FIG. 7 is a diagram illustrating a message transceived between a source node and a destination node in order to share a final shared secret key in the secret key sharing method in accordance with the third illustrative embodiment.

Referring to FIG. 7, a source node A transmits a secret key activation message KATV1 to a sharing node K. the secret key activation message includes a secret key sharing request message identifier UID, a destination node address D, and a seed key $S_{AD}$ encrypted with a shared secret key K' between the source node A and a destination node D and encrypted again with a shared secret key $K_{AK}$ between the source node A and the sharing node K. Here, the seed key $S_{AD}$ between the source node A and the destination node D is randomly generated at the source node A. Here, the seed key $S_{AD}$ is encrypted with the shared secret key K' between the source node A and the destination node D in order to prevent hacking of the seed key $S_{AD}$ by the sharing node K that might be an attacker node.

The sharing node K adds an address of the source node A to the received secret key activation message KATV1 and updates the secret key activation message by encrypting the seed key $S_{AD}$ encrypted with the shared secret key K' between the source node A and the destination node D with a secret key between the sharing node K and the destination node. The sharing node K transmits the updated secret key activation message KATV2 to the destination node D. The destination node D extracts a secret key sharing request message identifier from the received secret key activation message KATV2, and extracts a shared secret key matched with the secret key sharing request message based on the extracted secret key sharing request message identifier. The destination node D decrypts the received seed key $S_{AD}$ with the extracted shared secret key k' and generates a final shared secret key between the source node A and the destination node D from a combination of the decrypted seed key $S_{AD}$ and the shared secret key k'. The way of combination of the seed key $S_{AD}$ and the shared secret key k', that generates the final shared secret key between the source node A and the destination node D is shared between the source node A and the destination node D.

Meanwhile, after generating the final shared secret key, the destination node D generates a secret key activation response message KAACK and transmits the generated secret key activation response message KAACK to the source node A through a routing path for a secret key sharing response message. The generated secret key activation response message KAACK includes the seed key $S_{AD}$ between the source node A and the destination node D encrypted with the final shared secret key. As the source node A receives the secret key activation response message KAACK, the final shared secret key is shared between the source node A and the destination node D.

The illustrative embodiments may be embodied by a computer executable program and may be implemented by a general purpose digital computer that executes the program using a computer readable storage medium.

The computer readable storage medium may include, but not limited to, a magnetic storage medium (e.g., a ROM, a floppy disk, a hard disk, etc.), an optical storage medium (e.g., a CD-ROM, a DVD, etc.) and a carrier wave (e.g., transmission through Internet).

The above description of the illustrative embodiments is provided for the purpose of illustration, and it would be understood by those skilled in the art that various changes and modifications may be made without changing technical conception and essential features of the illustrative embodiments. Thus, it is clear that the above-described illustrative embodiments are illustrative in all aspects and do not limit the present disclosure. The scope of the inventive concept is defined by the following claims and their equivalents rather than by the detailed description of the illustrative embodiments. It shall be understood that all modifications and embodiments conceived from the meaning and scope of the claims and their equivalents are included in the scope of the inventive concept.

What is claimed is:

1. A method for sharing a secret key between a source node and a destination node in a multi-hop wireless communication network, the method comprising:
   (a) adding, by each forward intermediate node on a routing path of a secret key sharing request message transmitted from the source node to the destination node, a secret key between the forward intermediate node and a node before the forward intermediate node to the secret key sharing request message;
   (b) generating, by the destination node, a shared secret key between the source node and the destination node from the secret key between the forward intermediate node and the node before the forward intermediate node added in the secret key sharing request message;
   (c) adding, by each backward intermediate node on a routing path of a secret key sharing response message transmitted from the destination node to the source node in response to the secret key sharing request message, a secret key between the backward intermediate node and a node before it to the secret key sharing response message; and
   (d) generating, by the source node, the shared secret key between the destination node and the source node from the secret key between the backward intermediate node and the node before it added in the secret key sharing response message.

2. The method of claim 1,
   wherein the secret key between the backward intermediate node and the node before the backward intermediate node is encrypted with a secret key between the backward intermediate node and a node after the backward intermediate node.

3. The method of claim 2,
   wherein the secret key between the forward intermediate node and the node before the forward intermediate node or the secret key between the backward intermediate node and the node before the backward intermediate node is encrypted with a hash function.

4. The method of claim 3,
   wherein the secret key between the forward intermediate node and the node before the forward intermediate node is determined based on a physical layer characteristic therebetween, and
   the secret key between the backward intermediate node and the node before the backward intermediate node is determined based on a physical layer characteristic therebetween.

5. The method of claim 4,
   wherein the physical layer characteristic includes:
   a delay spread characteristic of a signal transceived between the forward intermediate node and the node before the forward intermediate node; and
   a delay spread characteristic of a signal transceived between the backward intermediate node and the node before the backward intermediate node.

6. The method of claim 4, further comprising:
   (e) transmitting, by the source node, a secret key activation message including a seed key between the source node and the destination node to a sharing node that shares a first safe shared key with the source node;
   (f) receiving, by the destination node, the secret key activation message from the sharing node that shares a second safe shared key with the destination node, and generating a final shared secret key between the source node and the destination node by extracting the seed key included in the secret key activation message; and
   (g) after generating the final shared secret key, transmitting, by the destination node, a secret key activation response message including the seed key from the destination node to the source node.

7. The method of claim 6,
   wherein the seed key between the source node and the destination node in the secret key activation message transmitted from the source node to the sharing node is primarily encrypted with the shard secret key between the source node and the destination node, and the primarily encrypted seed key between the source node and the destination node is secondarily encrypted with the first safe shared key, and
   the seed key between the source node and the destination node in the secret key activation message transmitted from the sharing key to the destination node is primarily encrypted with the secret shared key between the source node and the destination node, and the primarily encrypted seed key between the source node and the destination node is secondarily encrypted with the second safe shared key.

8. The method of claim 6,
wherein the seed key in the secret key activation response message is encrypted using a combination of the shared secret key between the destination node and the source node and the seed key.

9. The method of claim 1,
wherein the process (b) comprises:
receiving the secret key sharing request message by the destination node;
extracting a secret key between each forward intermediate node and a node before the forward intermediate node from the received secret key sharing request message; and
generating a shared secret key between the source node and the destination node by adding the extracted secret key and a secret key between the destination node and a node before the destination node.

10. The method of claim 1,
wherein the process (d) comprises:
receiving the secret key sharing response message by the source node;
decrypting the received secret key sharing request message with a secret key between the source node and a node before the source node;
extracting a secret key between each backward intermediate node and a node before the backward intermediate node from the decrypted secret key sharing response message; and
generating a shared secret key between the destination node and the source node by adding the extracted secret key and the secret key between the source node and the node before the source node.

11. The method of claim 6,
wherein the secret key activation message received by the destination node includes an identifier of the secret key sharing request message and an address of the source node that has transmitted the secret key sharing request message, and
the destination node identifies the shared secret key between the source node and the destination node and the source node that has transmitted the secret key sharing request message.

\* \* \* \* \*

UNITED STATES PATENT AND TRADEMARK OFFICE
CERTIFICATE OF CORRECTION

PATENT NO. : 8,719,564 B2
APPLICATION NO. : 13/775379
DATED : May 6, 2014
INVENTOR(S) : Choong Seon Hong Page 1 of 1

It is certified that error appears in the above-identified patent and that said Letters Patent is hereby corrected as shown below:

In the Specification

Column 6, line 54, please replace "$S_{AB}''$" with -- $S_{AB}'$ --

In the Claims

Column 12, claim 7, line 58, please replace "shard" with -- shared --

Signed and Sealed this
Ninth Day of September, 2014

Michelle K. Lee
*Deputy Director of the United States Patent and Trademark Office*